US008505569B2

(12) United States Patent
Greger

(10) Patent No.: US 8,505,569 B2
(45) Date of Patent: Aug. 13, 2013

(54) RESIDUE COLLECTOR

(76) Inventor: Peter Greger, Hammersbach (DE)

(*) Notice: Subject to any disclaimer, the term of this patent is extended or adjusted under 35 U.S.C. 154(b) by 215 days.

(21) Appl. No.: 12/919,763

(22) PCT Filed: Jul. 26, 2008

(86) PCT No.: PCT/DE2008/001233
§ 371 (c)(1), (2), (4) Date: Dec. 6, 2010

(87) PCT Pub. No.: WO2009/112002
PCT Pub. Date: Sep. 17, 2009

(65) Prior Publication Data

US 2011/0094603 A1 Apr. 28, 2011

(30) Foreign Application Priority Data

Mar. 13, 2008 (DE) .................... 20 2008 003 576 U

(51) Int. Cl.
*F16K 23/00* (2006.01)

(52) U.S. Cl.
USPC ........... 137/312; 137/177; 285/150; 285/285; 285/290; 285/291

(58) Field of Classification Search
USPC .................. 137/171, 312, 802; 62/150, 285, 62/291, 290; 138/118, 119
See application file for complete search history.

(56) References Cited

U.S. PATENT DOCUMENTS

| | | | | |
|---|---|---|---|---|
| 4,057,075 | A * | 11/1977 | Muschelknautz et al. | 137/171 |
| 6,338,357 | B1 * | 1/2002 | Zevgolis | 137/312 |
| 7,216,778 | B2 * | 5/2007 | Kaeb | 137/312 |
| 7,854,238 | B2 * | 12/2010 | Zatarain | 62/285 |
| 2004/0079428 | A1 * | 4/2004 | Houston et al. | 138/118 |
| 2006/0097427 | A1 * | 5/2006 | Klein | 62/285 |
| 2007/0144198 | A1 | 6/2007 | Lee | |

FOREIGN PATENT DOCUMENTS

| | | | |
|---|---|---|---|
| DE | 29 18 057 | A1 | 12/1980 |
| DE | 101 27 796 | C1 | 10/2002 |

* cited by examiner

*Primary Examiner* — Stephen M Hepperle
*Assistant Examiner* — Craig J Price
(74) *Attorney, Agent, or Firm* — Edwin D. Schindler

(57) ABSTRACT

A residue collector for collecting residual fluid from a low pressurized hose, which runs perpendicularly or at an incline, includes two pipe nozzles that are joined together, the interior spaces of which are connected to each other and form a hollow space, which can be connected to an upwardly extending portion of the low pressurized hose by way of an upper orifice and can be connected to a downwardly extending portion of the low pressurized hose by way of a lower orifice. The front end of the pipe nozzle that is connected to the lower orifice is closed and a protuberance is provided into the front end of the pipe nozzle that is connected to the upper orifice. The protuberance is directed outwardly and with the material thereof being flexible and having a wall thickness that is permits folding, at least partially, into the hollow space due to low pressurization.

10 Claims, 3 Drawing Sheets

Figure 1:
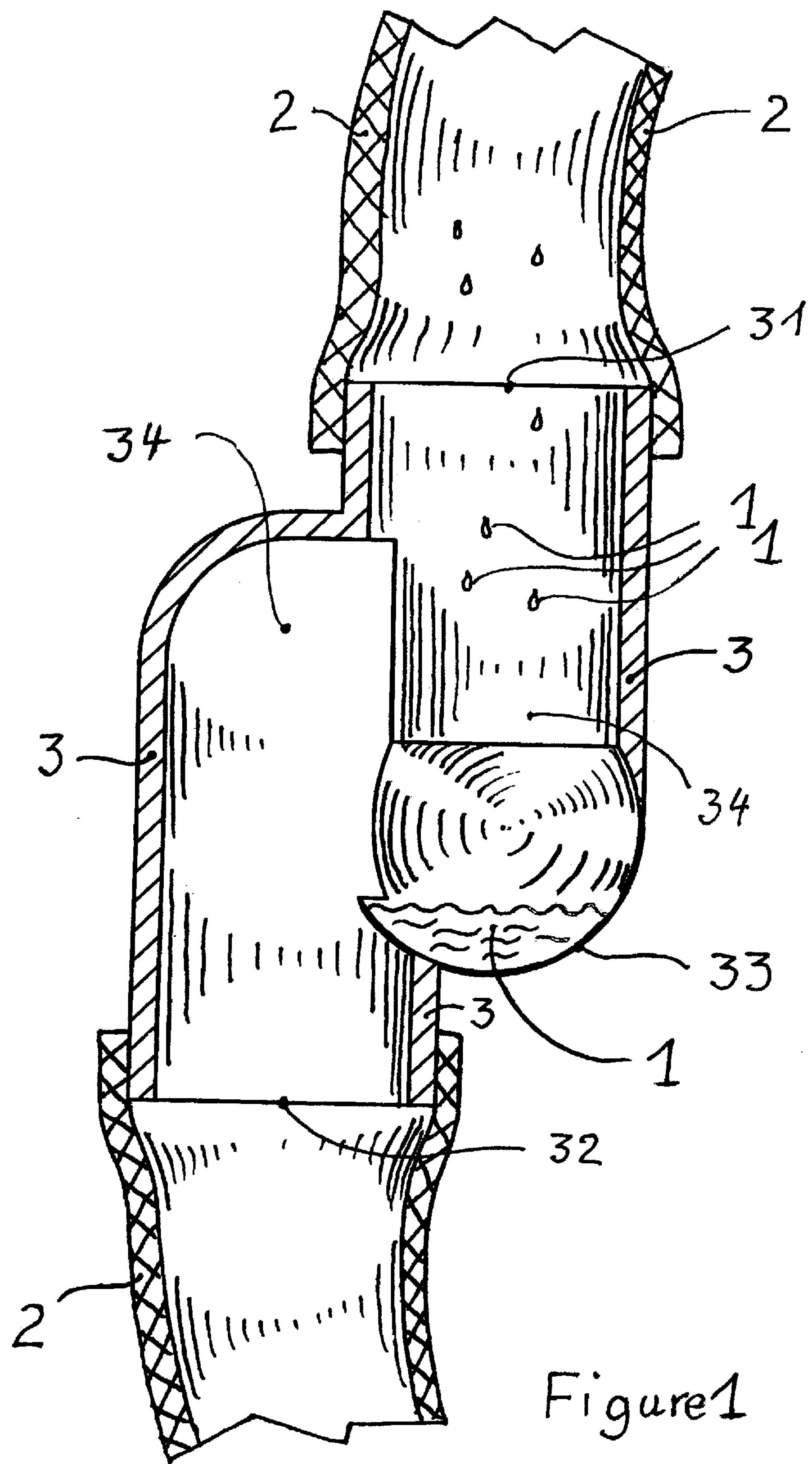

2
2
31
34
1
1
3
3
34
33
3
1
32
2

2
2
31
34
1
1
3
3
34
33
3
1
32
2

2
2
31
34
3
3
34
33
3
32
2

RESIDUE COLLECTOR

BACKGROUND OF THE INVENTION

1. Technical Field of the Invention

The invention relates to a residue collector for the collection of residual liquid in a low-pressure tube, which extends vertically or inclined, consisting of two adjoining pipe nozzles, the interior spaces of which are in mutual connection and form a cavity, which, via an orifice, can be connected to a portion of the low-pressure tube, which extends upwardly, and can be connected via a lower orifice to a downwardly extended portion of the low-pressure tube.

2. Description of the Prior Art

In tubes via which liquid or a mixture of air and liquid is sucked certain residues always remain after the low pressure is disconnected. These residues are much greater in a corrugated tube or in a tube that is reinforced with ribs or with a spirally winding rib than with smooth tubes, and often lead to the very troublesome effect that the last residue of the liquid that was just sucked in runs out again when the low-pressure is switched off. This effect occurs in particular in the case of perpendicularly extending tubes, but even with only slightly inclined tubes.

In the prior art, to remedy this problem, flap valves are known, which seal the suction orifice in a liquid-tight manner briefly before the low pressure is switched off, and thereby prevent any liquids running back from escaping. However, the disadvantage is not only the increased installation work for the flaps and the additional work for controlling the flap, but also the necessity to dispose of the liquid that has collected above the flap in an additional operation with an additional trap vessel.

Another problem solution that is widely known in the prior art is the siphon, as S-shaped pipe section, the downwardly pointing bend of which is so strongly curved that the liquid is deposited therein and can no longer flow out. If such a siphon is unfilled when the low pressure is switched off, residual liquids that are still located in the tube can collect therein.

The disadvantage however is that with the restoration of the low pressure, the tube is sealed off in an airtight manner by the liquid in the siphon, so that the suction pump must at first build up a subatmospheric pressure high enough to move the entire liquid out of the siphon tube. Only then can the low-pressure tube take up liquid from the outside again.

The smaller the radius of curvature of the siphon bend is chosen—for a constant diameter of the tube—the smaller the amount of liquid is stored therein, and therefore the lower the threshold value of the low pressure before the first suction. With such a strongly curved siphon, however, its increased flow resistance is disadvantageous, specifically during continuous operation, whereas a siphon with a very large radius of curvature only requires a high low-pressure value on start-up and generates only a small flow resistance.

SUMMARY OF THE INVENTION

Against this background, ft is the object of the invention to develop a residue collector for low-pressure tubes that takes up a small apace, permits a practically unrestricted flow and, in continuous operation, do not pose a very large resistance to the liquid stream than the tube on its own.

As a solution, the invention presents a residue collector in which the end side of that pipe nozzle that is connected to the lower orifice is sealed and, into the end face of the pipe nozzle that is connected to the upper orifice, a bulge is introduced, which is turned outwardly and the material of which is so flexible and its wall thickness designed such that it, at least for the most part, can be pushed into the hollow space by virtue of the low pressure.

The function of the residue collector according to the invention differs from the known siphon in that, in the inactive state, the entire cross-section of the tube is completely free, so that when the vacuum generator is switched on, there is no elevated load resulting from the movement of the quantity of fluid out of the siphon. Rather, the vacuum generator can start while idling, which is beneficial for its lifetime and its energy consumption.

With the gradual build-up of pressure, the bulge moves continually into the cavity, and thereby also continually emits the stored liquid continuously into the cavity, where it is entrained by the liquid stream without generating load peaks for the vacuum in the suction tube. From a particular subatmospheric pressure determined by the design and material thickness and the elasticity of the material, the bulge is completely pushed into the cavity of the intermediate piece and then does not emit any more liquid.

Although the bulge forms a resistance in the liquid stream, which for the most part can be compensated by the fact that, in the region of the bulge, the tube cross-section is enlarged to such an extent that, even with the bulge completely pushed-in, the same flow area as at the upper orifice of the residue collector is available.

The further losses resulting from turbulence in the region of the inwardly projecting bulge are not very high and can be reduced by corresponding shaping. It is advantageous, for example, to design the bulge as a hemisphere, that is to say as the section of a hollow sphere. When this hollow sphere is completely pushed inward, it forms a spherical segment that projects into the stream.

A sphere that projects into a flow stream generates some minor turbulence in its flow shadow. This turbulence can be perceptibly reduced by providing the bulge with a drop-shaped profile in the flow direction, known colloquially as a streamlined shape. If the rounded side of the drop opposes the flow, the point side of the drop-shaped cross-section ensures an almost turbulence-free progress of the flow at the obstruction.

The bulge can alternatively be shaped like a bag. It is conceivable to form additional protrusions or extensions at the end of the bag.

It is necessary for the functioning of the residue collector according to the invention for the bulge to be made of a permanently flexible material, so that it can flip from its positive shape into its negative shape and in the process is permanently liquid tight. Suitable materials include all flexible thermoplastics, silicones, rubber and watertight composites of all kinds. It is also conceivable to use composite materials comprising spring-steel strips, which are embedded in the manner of a network or grid in a liquid-tight polymer or in a composite material comprising polymer and textile material.

It is also conceivable that the two pipe nozzles and the bulge are made integrally of one material, which has a certain elasticity. The bulge is thus manufactured in a unity together with the residue collector. Alternatively it can be produced as a single part, which is then used in a residue collector. If the wall thickness of the bulge is considerably less than in the other region, the walls of the pipe nozzle remain dimensionally stable, while the bulge migrates inward with only a relatively low negative gauge pressure.

In any configuration, with a residue collector according to the invention, the two orifices can be designed such that they are suitable for different tube diameters. For this purpose, the two pipe nozzles can be enlarged at their open end in a stepped or inclined manner, the internal diameter of each step being adapted to the external diameter of a low-pressure tube. In this variant, the low-pressure tubes can be guided into the ends of the two pipe nozzles.

For this purpose, the two pipe nozzles can be enlarged at their open end in a stepped or inclined manner, the internal diameter of each step being adapted to the external diameter of low-pressure tubes. In this variant, the low-pressure tubes can be pushed over the ends of the two pipe nozzles. With both variants, the effect is achieved that a standard type of residue collector can be used for multiple tube sizes.

Alternatively, the cross-section, when adjoined, of the interior spaces of the first pipe nozzle and the second pipe nozzle in the region of the bulge, or protuberance is enlarged so that the protuberance, when completely folded inward in a cross-sectional area, remains no larger than the upper orifice.

In any case, the receiving capacity of the bulge should be chosen large enough to allow the likely amount of residual liquid to be collected even with the largest tube cross-section.

DETAILED DESCRIPTION OF THE PREFERRED EMBODIMENTS

The cavity of a residue collector according to the invention consists in principle of two adjoining pipe nozzles which partly cover one another, a bulge being integrally formed on one of the two pipe nozzles. A pipe nozzle in this case can be a pipe section with a circular cross-section that extends completely rectilinearly. Alternatively, the pipe nozzle can be entirely or partly curved, the curvature describing a circular segment, or the pipe end being cylindrically shaped.

The principle of a residue collector according to the invention, however, includes pipe pieces that have an elliptical, oval or any arbitrary cross-section. Even polygonal cross-sections are possible, but because of the increased flow resistance and complicated production in practice are probably somewhat unlikely. The curvature of the pipe piece can also be not only a circular segment but also part of an ellipse or an oval or an arbitrary curvature. The curvature can also be formed from contiguous rectilinear lines, that is to say as a polygon.

An important reason for not forming the pipe nozzle with the same cross-section over its entire length is the cross-section reduction due to the inwardly pushed bulge. To compensate somewhat for this constriction. It is appropriate to enlarge the cross-section in the region of the bulge such that, in the case of bulges that are maximally pushed into the interior space, it is almost as large or somewhat smaller than the smaller of the two orifices of the residue collector for connection of the low-pressure tube. Then, as a result of the Venturi effect, that is to say by an increased velocity in the region of the bulge, a low pressure occurs, which pushes the bulge automatically into the inner space.

Alternatively, it is also conceivable that the cross-section of the residue collector in the region of the bulge is so large that, even when the bulge is pushed in it is almost as large as the smaller orifice at the inlet or at the outlet of the residue collector. Then, however, with a flowing medium, only a very small force, if any, acts on the bulge, which draws it automatically into the interior space in order to empty it there.

Instead, there would then have to be external pressure on the bulge in order to empty it in this way. For example by pressure with the finger.

Such a finger pressure can then of course also be applied in the case of a bulge dimensioned for automatic emptying. Thus, for example, with a slowly rising flow rate through the collector, the bulge could be emptied at an early stage.

Small amounts of liquid can accumulate on the inner wall of the "upper" pipe nozzle in the region of the orifice between the two pipe nozzles, and from there pass by the bulge by surface adhesion into the "lower" pipe nozzle and from there—undesirably—emerge. To counteract this, ribs, fins, notches or channels are proposed, which start above the orifice between the two pipe nozzles and from there run obliquely to the longitudinal axis of the pipe nozzle to near the bulge. At the end of these guide elements, the small amounts of liquid emerge, run for a short distance along the inner wall of the "upper pipe nozzle" down into the bulge, where they are collected.

A fundamental property of the residue collector according to the invention is that the bulge, which receives the residual liquid must always point downward so that the liquid runs into it under force of gravity and remains there.

For applications in which the tube can rotate about its longitudinal axis, rotatable couplings can be inserted on one or both sides of the residue collector, so that the residue collector can be held in a functional position independently of any rotations of the tube.

If, however, with a rotation of the tube, the orientation of a residue collected inserted into the tube also changes, it is appropriate, instead of only a single residue collector, to combine a plurality of residue collectors with different directions of the bulge, to produce a multiple residue collector.

In an exemplary embodiment, three residue collectors that are connected in series have their bulges offset by about 120° with respect to one another. In this case, even with a twisting low-pressure tube, at least one bulge is always entirely or partly pointing downwards, so that it is possible to receive the residual liquid therein.

If this interception capacity is not sufficient, further residue collectors can be inserted into the low-pressure tube, though it should be noted that a very elongated structure is produced by the series connection of a plurality of residue collectors. If, in the most unfavourable case, only the residue collector most distant from the outlet receives the residual liquid, it may occur that enough liquid collects in the rest of the tube that an amount of liquid—even if small—can still emerge from the low-pressure tube after disconnection of the vacuum.

It is therefore also possible in principle to connect a plurality of residue collectors in parallel. If they are grouped in a stellar arrangement around a longitudinal axis, at least one bulge points downwards and can receive residual liquids. For the connection of all the upper orifices and all the lower orifices of all residue collectors, a chamber-like widening of the tube can be provided, which has an orifice for each attached residue collector.

Alternatively the pipe nozzles of each individual residue collector can be partially fused with one another during the construction, so that they grow like ribs out of the low-pressure tube and then form residue collectors that lie closely against one or even merge into one another, with one bulge in each case. This results in a multiple residue collector that is compacter and more cost effective than the series connection of a plurality of individual residue collectors.

In the design of such residue collectors connected in parallel, it should be noted that, with a corresponding low pressure, all the bulges are pushed back into the interior reducing the size of the flow cross-section. Preferably, the entire cross-section in all individual residue collectors should not be smaller that the upper or lower orifice of the multiple residue collector.

BRIEF DESCRIPTION OF THE DRAWING FIGURES

Figure 2:
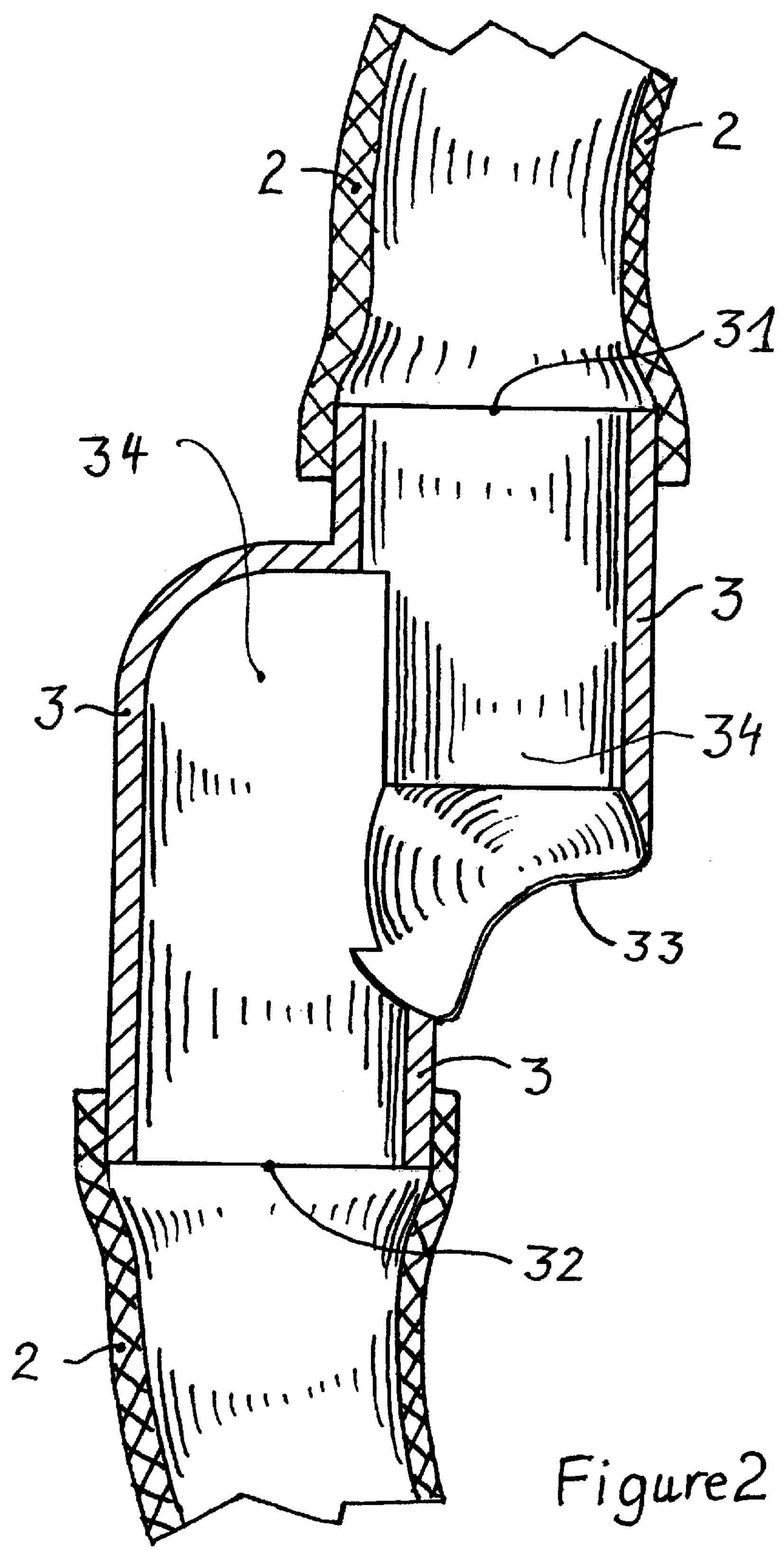
Figure 3:
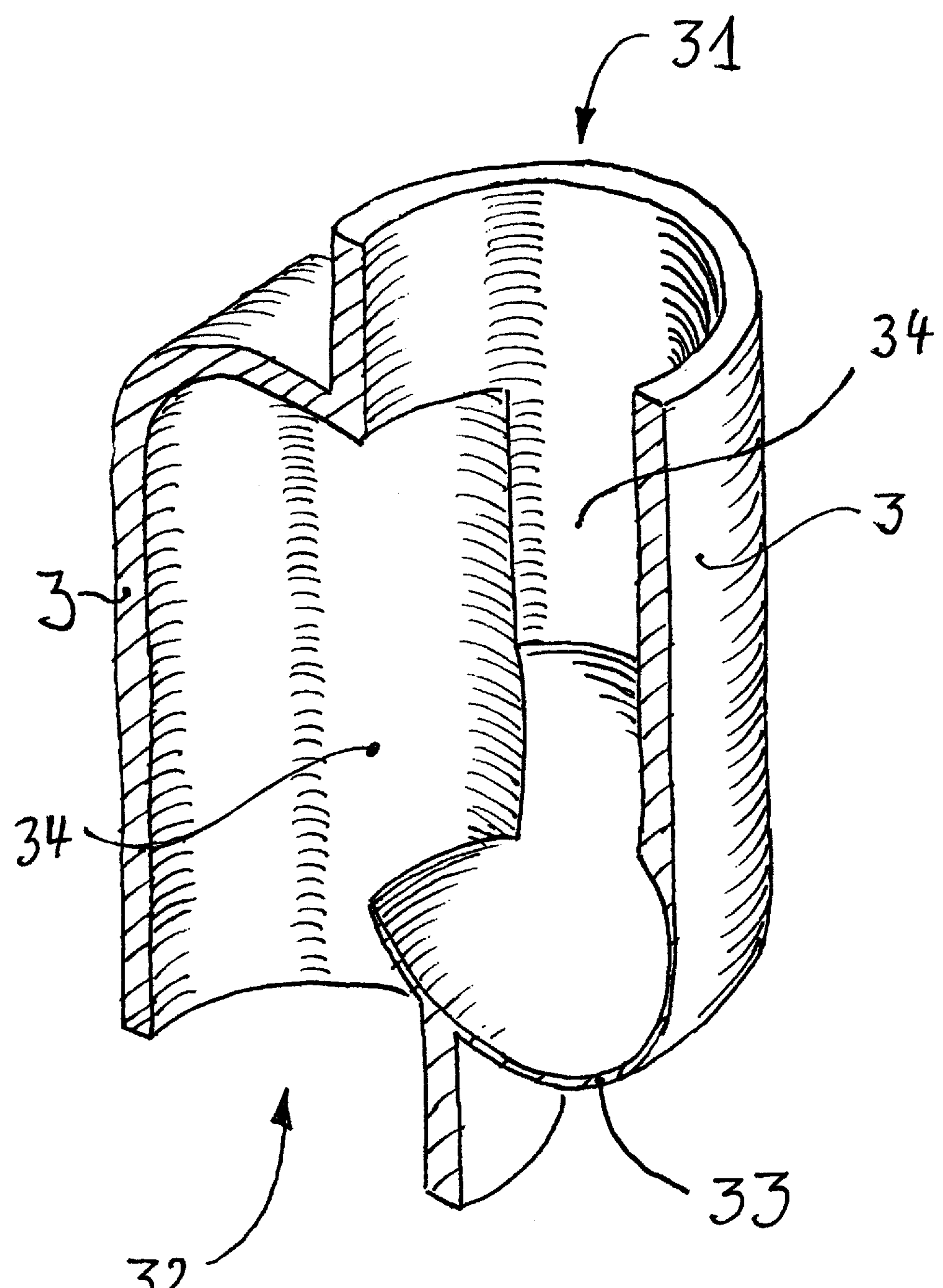

Further details and features of the invention are explained below in greater detail with reference to examples. However, they are not intended to limit the invention but only explain it. In schematic view, FIG. 1 shows a section through a residue collector with mounted low-pressure tubes and residual liquids FIG. 2 shows the same view as FIG. 1, but without residual liquid FIG. 3 shows a perspective view of the residue collector shown in cutaway view in FIGS. 1 and 2

DETAILED DESCRIPTION OF THE DRAWING FIGURES

In detail, the figures show:

FIG. 1 shows a residue collector 3, which is cut in the flow direction and on the upper orifice 31 of which a low-pressure tube 2 is mounted, which continues upward, and on the lower orifice 32 of which the downwardly facing portion of the low-pressure tube 2 is mounted. FIG. 1 shows the inactive state of a low-pressure tube 2 a short time after the low pressure has been switched off, some residual liquid 1 dripping out of the upper low-pressure tube 2 and collecting in the bulge 33, which is hemispherical in this case, of the residue collector 3.

In FIG. 1, it can be seen that, in this exemplary embodiment, two pipe nozzles are joined together such that their longitudinal axes run parallel to one another and the cross sections overlap by about a fifth of the diameter, and the two nozzles are somewhat displaced with respect to one another in their longitudinal axis.

In FIG. 1, it can be understood that the bulge 33 lies below the upper orifice 31, such that all the residual liquids 1 fall either through the upper orifice 31 and the cavity 34 directly into the bulge 33, or run down on the insider along the wall of the cavity 34 until they also collect in the bulge 33. These residual liquids 1 are represented in FIG. 1 by small drops.

In FIG. 1, it can be seen how the residual liquid 1 collects in the lower portion of the hemispherical bulge 33, which is here represented by wavy lines.

FIG. 2 shows the operating state of a low-pressure tube 2 with a residue collector according to the invention, which was shown in FIG. 1 in the inactive state. Unlike the inactive state, in operation, the flexible bulge 33 is pushed by virtue of the low pressure into the cavity 34 of the residue collector 3. In FIG. 2, it can clearly be seen that the internal volume of the hemispherical bulge 33 is thereby greatly reduced.

In comparison to FIG. 1, the residual liquid 1 that has collected in the steady state has, by the inward pushing of the bulge 33, been emptied into the cavity of the residue collector 3, and from there has been entrained by the flow into the upper low-pressure tube 2, and even the very small residue, which, by virtue of the geometry, could have still been held in the region of the bulge 33 shown at the left, has also been entrained by the flow. Therefore no more residual liquid 1 can be seen in FIG. 2. The liquid that is flowing through in the operating state is, for the sake of clarity, not shown.

FIG. 3 also shows the residue collector 3 which was shown in FIGS. 1 and 2, also in the same longitudinal section, but in this case in perspective view. FIG. 3 clearly shows that the embodiment shown here is constructed from two partly interlocking pipe nozzles, wherein an approximately rectangular orifice is created in the centre of the cavity 34, which connects the cavities of the two pipe nozzles to one another.

One end of each pipe nozzles in each case forms the orifice of the residue collector. In the case of the first pipe nozzle with the lower orifice 32, the other end is sealed. In the case of the second pipe nozzle below the upper orifice 31, the bulge 33 according to the invention, in this example a hemispherical segment, is mounted on the free end.

In FIG. 3 it can be clearly seen that the integrally formed hemispherical bulge 33 has a significantly smaller wall thickness than the other regions of the residue collector 3. FIG. 3 clearly demonstrates that the bulge 33 can fold into the cavity 34, and how this can occur.

LIST OF REFERENCE DIGITS

1. Residual liquid in the low-pressure tube 2
2 Low-pressure tube can contain residual liquid 1
3 Residue collector inserted in the low-pressure tube 2
31 Upper orifice of the residue collector 3
32 Lower orifice of the residue collector 3
33 Bulge on the residue collector 3
34 Cavity in the interior of the residue collector 3

The invention claimed is:

1. A residue collector for collecting a residual liquid from a low-pressurized tube extending vertically or at an incline, comprising:

a first pipe nozzle; and, a second pipe nozzle adjoining said first pipe nozzle with interior spaces of said first pipe nozzle and said second pipe nozzle being mutually connected and forming a hollow space which, via an upper orifice, is connectable to a portion of a low-pressurized tube extending upwardly and, via a lower orifice, is connectable to a portion of the low-pressurized tube extending downwardly, wherein a front end of either said first pipe nozzle or said second pipe nozzle that is connected to the upper orifice is closed and a protuberance is provided into the other front end of said first pipe nozzle or said second pipe nozzle that is connected to the lower orifice, said protuberance being directed outwardly and with material thereof being flexible and having a wall thickness permitting folding, at least partially, into the hollow space due to low pressurization.

2. The residue collector according to claim 1, wherein said first pipe nozzle and said second pipe nozzle are formed as a hollow cylinder.

3. The residue collector according to claim 1, wherein said first pipe nozzle and said second pipe nozzle are curved.

4. The residue collector for collecting a residual liquid according to claim 1, wherein said first pipe nozzle and said second pipe nozzle are curved around two axes, said two axes being parallel to one another and offset relative to one another.

5. The residue collector according to claim 1, wherein said protuberance is located substantially coaxially beneath the upper orifice.

6. The residue collector according to claim 1, wherein said material includes a permanently elastic material.

7. The residue collector according to claim 1, wherein said protuberance is hemispherically-shaped.

8. The residue collector for collecting a residual liquid according to claim 1, wherein a cross-section, when adjoined, of the interior spaces of said first pipe nozzle and said second pipe nozzle in a region of said protuberance is enlarged so that said protuberance, when completely folded inward in a cross-sectional area, remains no larger than the upper orifice.

9. A multiplicity of residue collectors for collecting a residual liquid, comprising:

a plurality of residue collectors with each residue collector of said plurality of residue collectors including:

a first pipe nozzle; and, a second pipe nozzle adjoining said first pipe nozzle with interior spaces of said first pipe nozzle and said second pipe nozzle being mutually connected and forming a hollow space which, via an upper orifice, is connectable to a portion of a low-pressurized tube extending upwardly and, via a lower orifice, is connectable to a portion of the low-pressurized tube extending downwardly, wherein a front end of either said first pipe nozzle or said second pipe nozzle that is connected to the upper orifice is closed and a protuberance is provided into the other front end of said first pipe nozzle or said second pipe nozzle that is connected to the lower orifice, said protuberance being directed outwardly and with material thereof being flexible and having a wall thickness permitting folding, at least partially, into the hollow space due to low pressurization, said multiplicity of residue collectors having each said residue collector connected in series.

10. The multiplicity of residue collectors according to claim 9, wherein one said protuberance of one said residue collector of said plurality of residue collectors faces downwardly and each said protuberance of remaining said residue collectors of said plurality of residue collectors face in other directions.

* * * * *